United States Patent
Tiruvallur et al.

(10) Patent No.: US 9,043,521 B2
(45) Date of Patent: *May 26, 2015

(54) TECHNIQUE FOR COMMUNICATING INTERRUPTS IN A COMPUTER SYSTEM

(71) Applicant: Intel Corporation, Santa Clara, CA (US)

(72) Inventors: Keshavan Tiruvallur, Tigard, OR (US); Rajesh Parthasarathy, Hillsboro, OR (US); James B. Crossland, Banks, OR (US); Shivnandan Kaushik, Portland, OR (US); Luke Hood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/675,868

(22) Filed: Nov. 13, 2012

(65) Prior Publication Data

US 2014/0136746 A1    May 15, 2014

(51) Int. Cl.
G06F 13/24 (2006.01)
G06F 13/26 (2006.01)

(52) U.S. Cl.
CPC ............... *G06F 13/24* (2013.01); *G06F 13/26* (2013.01)

(58) Field of Classification Search
USPC ......................................................... 710/269
See application file for complete search history.

(56) References Cited

U.S. PATENT DOCUMENTS

| 5,495,615 | A | 2/1996 | Nizar et al. |
| 5,987,538 | A | 11/1999 | Tavallaei |
| 6,370,606 | B1 | 4/2002 | Bonola |
| 6,968,412 | B1 | 11/2005 | Nalawadi |
| 7,051,137 | B2 | 5/2006 | Poisner |
| 7,143,223 | B2 | 11/2006 | Hack et al. |
| 7,627,706 | B2 | 12/2009 | Kaushik et al. |
| 2001/0052043 | A1 | 12/2001 | Pawlowski et al. |
| 2004/0088460 | A1 | 5/2004 | Poisner |
| 2006/0085179 | A1 | 4/2006 | Hack et al. |
| 2006/0095624 | A1 | 5/2006 | Raj et al. |
| 2007/0067521 | A1 | 3/2007 | Shen et al. |
| 2009/0070511 | A1 | 3/2009 | Kaushik et al. |
| 2009/0228736 | A1 | 9/2009 | Hendrickson et al. |

FOREIGN PATENT DOCUMENTS

| KR | 10-0292660 B1 | 9/2001 |
| WO | WO-95/18416 | 7/1995 |

OTHER PUBLICATIONS

Patent Cooperation Treaty International Search Report, International Application No. PCT/US2009/061641, Korean Intellectual Property Office, Republic of Korea, May 20, 2010, 9 pages.

(Continued)

*Primary Examiner* — Ryan Stiglic

(74) *Attorney, Agent, or Firm* — Mnemoglyphics, LLC; Lawrence M. Mennemeier

(57) ABSTRACT

A technique to enable efficient interrupt communication within a computer system. In one embodiment, an advanced programmable interrupt controller (APIC) is interfaced via a set of bits within an APIC interface register using various interface instructions or operations, without using memory-mapped input/output (MMIO).

20 Claims, 4 Drawing Sheets

(56) References Cited

OTHER PUBLICATIONS

Intel 64 and IA-32 Intel Architecture Software Developer's Manual, vol. 3A, System Programming Guide, Part 1, Order No. 253668-038US, Apr. 2001, 12 pages.

IA-32 Intel Architecture Software Developer's Manual, vol. 2, Instruction Set Reference, Order No. 245471, 2001 p. 3-432.

IA-32 Intel Architecture Software Developer's Manual vol. 3: System Programming Guide, Order No. 245472, 2001 p. 7-15, 7-18.

Intel 64 Architecture x2APIC Specification, Reference No. 318148-003, Jun. 2008 p. 2-1 to 2-6, 2-13 to 2-16.

Office Action, German Application No. 10 2009 050 983.6-53, Mailed Jul. 3, 2010, 6 pages.

Intel Corporation; "Intel.RTM. 64 Architecture x2APIC Specification"; Intel Corporation; Document No. 318148; Revision 1; Sep. 2007, 39 pages.

| 31 | 20 | 19 18 | 17 16 | 15 | 14 | 13 | 12 | 11 | 10 8 | 7 0 |
|---|---|---|---|---|---|---|---|---|---|---|
| Reserved | | Dest | R | T | L | R | S | L/P | Mode | Vector |

401

| 31 | 0 |
|---|---|
| Destination ID | |

TECHNIQUE FOR COMMUNICATING INTERRUPTS IN A COMPUTER SYSTEM

RELATED APPLICATIONS

This is a Continuation of application Ser. No. 13/356,999, filed Jan. 24, 2012, now U.S. Pat. No. 8,312,198, issued Nov. 13, 2012, which is a Continuation of application Ser. No. 12/290,208, filed Oct. 28, 2008, now U.S. Pat. No. 8,103,816, issued Jan. 24, 2012.

FIELD OF THE INVENTION

Embodiments of the invention relate generally to the field of information processing and more specifically, to the field of communicating interrupts in computing systems and microprocessors.

BACKGROUND OF THE INVENTION

As processors incorporate more computing cores, either heterogeneous or homogeneous, and computer systems incorporate more processors, management of interrupts becomes increasingly difficult. Some prior art techniques have managed interrupts using a memory-mapped-input/output (MMIO) scheme, in which a processor or core (referred to generically herein as "agent") communicates interrupt information through a region of memory (e.g., DRAM) specifically reserved for interrupt communication information. For example, one prior art interrupt communicating technique, in which an advanced programmable interrupt controller (APIC) is to be programmed, may communicate the information to be programmed to the APIC through the MMIO region.

Communication of interrupt information to/from an APIC in through MMIO may have several drawbacks, which are exacerbated as the number of agents, and therefore interrupt traffic, increases. For example, MMIO accesses may require the memory region associated with the APIC to be mapped with an un-cached (UC) access attribute, which has a high performance overhead associated with it. The UC interface also enforces a serialization behavior, which may not be needed for a large subset of the APIC registers.

Using an MMIO interface may also require the use of posted write semantics and provides an agent with limited control over ordering of reads and writes to the APIC, which can impact the efficiency of sending interrupts with a larger number of reads/writes needed for basic interrupt related instructions. For example, sending an interrupt from one processor to another via inter-processor interrupt (IPI) in some prior art MMIO implementations, may require either 1 UC read and 2 UC writes if software does not need a guarantee that the interrupt has left the local APIC or 2 UC reads and 2 UC writes if software needs a guarantee that the interrupt has left the local APIC.

Use of a prior art MMIO interface may limit the ability to efficiently provide the system software desired mechanisms for interrupt delivery. Specific examples include operations for changing interrupt priority levels, which may be done in some prior art implementations by system software writing to the task priority register (TPR), and "end-of-interrupt" (EOI) operations, which may be done by system software writing to the EOI register of the APIC. System software may desire completion of these operations to be associated with completion of any re-prioritization operation so that any interrupts deterministically posted ahead of these operations are raised immediately following these operations. Lacking these guarantees, system software may use inefficient polling-based mechanisms, which increase APIC traffic.

Use of MMIO-based interrupt information may also affect other features within a computer system. For example, use of prior art MMIO interrupt communication interface techniques may increases virtualization complexity and overhead for virtualization of APIC accesses. For example, instructions that are used to access the interrupt controller may require the use of a virtual machine monitor (VMM) to support virtualization in a computer system. The overhead previously discussed with MMIO operations may be compounded with those used by the VMM to enter and exit virtual machines in the system.

Lastly, detecting and enforcing reserved bits within an APIC interface may have a high implementation cost when interfaced through MMIO, particularly as the number of agents using the APIC is increased. Some prior art interrupt communication techniques may limit the use of reserved bit locations for future extendable architectures since legacy software could incorrectly write to one of the registers.

For at least the above reasons, some prior art interrupt communication techniques, including those that use MMIO in communicating interrupt information, may not be suitable to support an increasing number of processing cores in multi-core processors or processors in multiprocessor systems.

BRIEF DESCRIPTION OF THE DRAWINGS

The present invention is illustrated by way of example and not limitation in the figures of the accompanying drawings.

FIG. 4 illustrates a block diagram of logic, in which at least one embodiment of the invention may be implemented.

DETAILED DESCRIPTION

Figure 1:
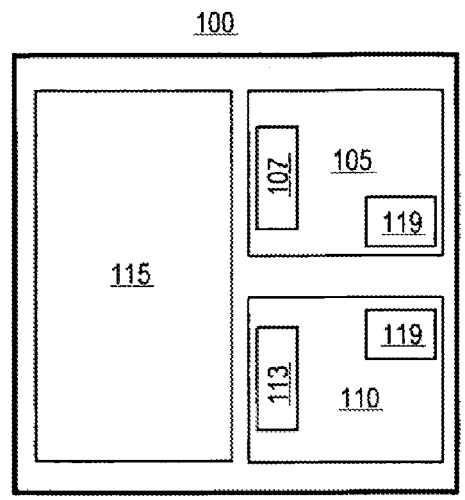
FIG. 1 illustrates a block diagram of a microprocessor, in which at least one embodiment of the invention may be used.

FIG. 1 illustrates a microprocessor in which at least one embodiment of the invention may be used. In particular, FIG. 1 illustrates microprocessor 100 having one or more processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to enable interrupt communication techniques, in accordance with at least one embodiment. The logic may include circuits, software or both to enable more efficient interrupt communication among a plurality of cores or processors than in some prior art implementations.

In one embodiment, logic 119 may include an APIC interface register or registers, the contents of which may be manipulated or read through a set of standard or implementation-specific instructions without using MMIO. For example, in one embodiment, the logic 119 includes a register interface, which may be communicated with using a native instruction set architecture (ISA). In one embodiment, supporting a register, registers, or other storage, which can be interfaced via native ISA, may reduce the number of access cycles and overhead associated with communicating interrupts, compared to some prior art techniques. In one embodiment, a model-specific register or registers (MSR) may be used and accessed via prior art read and write operations (e.g., "RDMSR" and "WRMSR" instructions) using prior art MSR addresses. In other embodiments, a new set of read/write instructions and address space for the interrupt controller registers. In one embodiment, new semantics are explicitly supported within a new APIC register interface that may reduce the number of access cycles, in relation to prior art, that are necessary to communicate interrupt information. In one embodiment, existing micro-architectural mechanisms may be used for reserved bit checking to ensure use of reserved register locations for future architecture extensions. In one embodiment, some system software may continue to use the legacy MMIO interface. Therefore, at least one embodiment may provide both the legacy as well as the new APIC register interface described herein. In one embodiment, an implementation of a new APIC register interface using MSRs may co-exist with the legacy interface with a relatively low incremental implementation cost.

Figure 2:
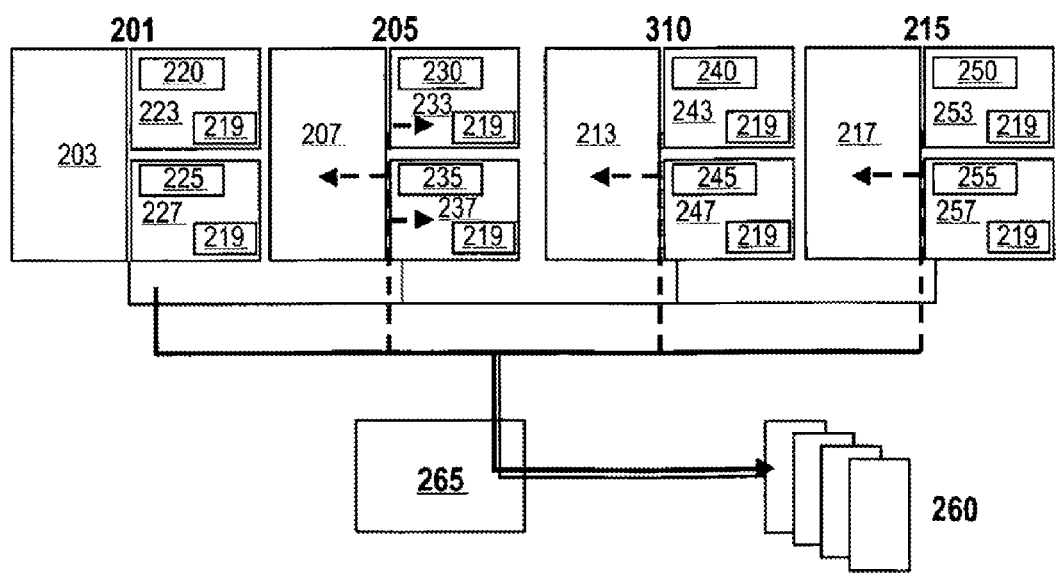
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to enable interrupt communication techniques, in accordance with at least one embodiment.

Figure 3:
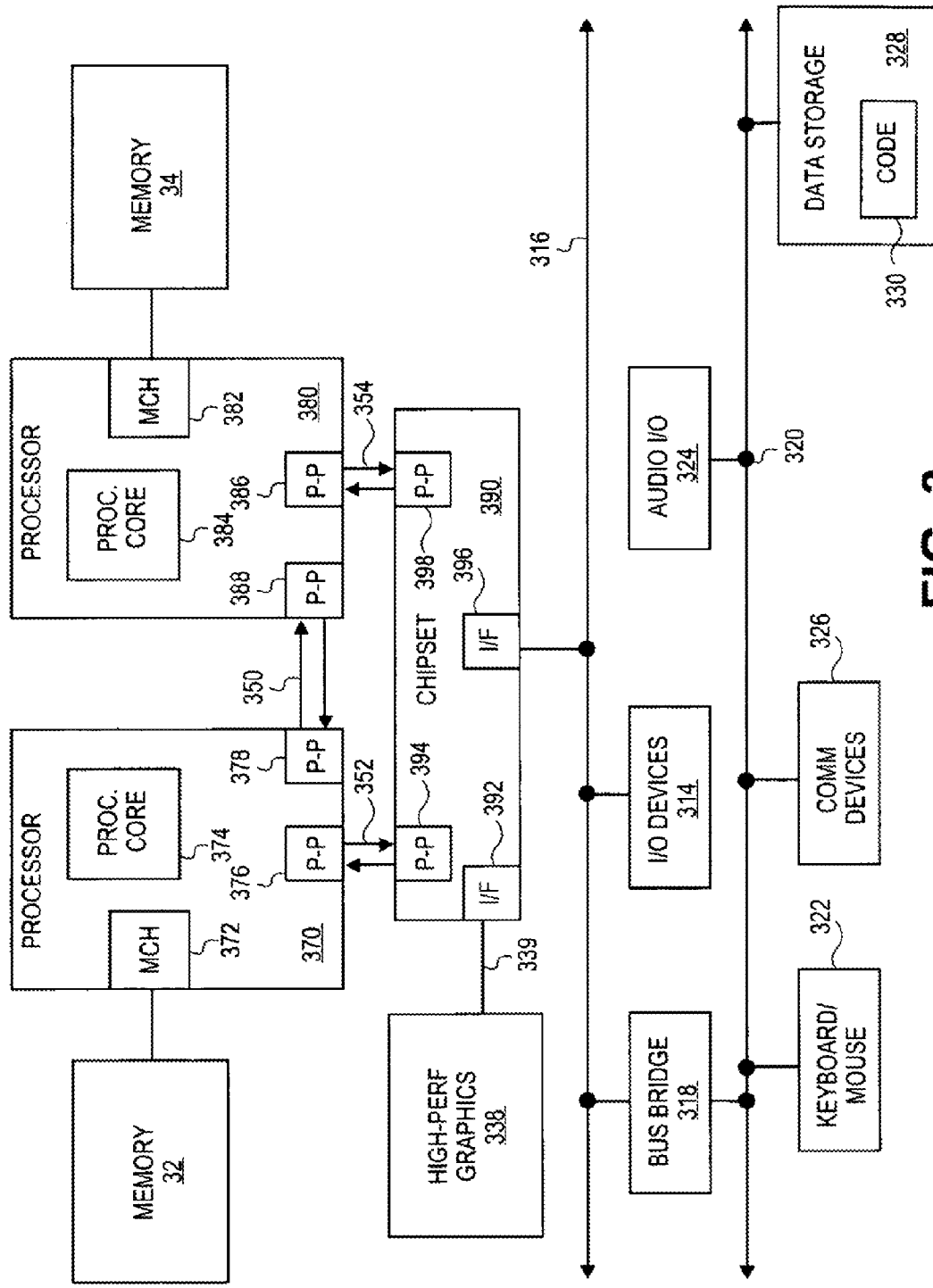
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic 319 to enable interrupt communication techniques, in accordance with at least one embodiment.

FIG. 4 illustrates logic to perform at least one embodiment of the invention. Particularly, FIG. 4 illustrates two APIC interrupt command registers (ICRs) that may be used to store information for enabling interrupt communication, according to one embodiment. Register 401, for example, includes reserved bits 31-20, and various other control bits for enabling APIC communication, according to one embodiment. In addition, FIG. 4 includes a register 405 for storing a 32 bit destination identification (ID) field, which is to identify the interrupt target agent. In some embodiments, the destination ID field could be within the same register 401 as the other control fields and bits. Furthermore, in some embodiments, the ICRs 401 and 405 are MSR's, whereas in other embodiments they are other registers or storage areas. In one embodiment, the bits stored in registers 401 and 405 may be manipulated and read using various prior art MSR write and read instructions, whereas in other embodiments, new instructions may be defined and used to manipulate and read the contents of registers 401 and 405.

The registers and information contained therein illustrated in FIG. 4 may be used, in one embodiment, to reduce interrupt transactions to a single register write, as opposed prior art techniques based on posted write semantics, which require a minimum of 1 UC read and two UC writes (if software did not need a guarantee of the interrupt having left the local APIC), or 2 UC reads and 2 UC writes (if software needed a guarantee of the interrupt having left the local APIC).

In one embodiment, a processor may generate an inter-processor interrupt (IPI) by writing to an interrupt command register of a local APIC. In one embodiment, the APIC ICR contains a legacy delivery status bit (bit 12 in FIG. 4) that indicates the status of the delivery of this interrupt, which may have read-only attributes. In one embodiment, a value of 0 in bit 12 of the ICR 401 indicates that there is currently no activity while a value of 1 indicates that a send is pending. In one embodiment, the delivery status bit (bit 12 of ICR 401) is cleared when the interrupt has been transmitted. In supporting a legacy interface, system software would busy-wait for the delivery status bit to clear prior to sending an IPI. Similarly if the semantics of the send operation required that the interrupt be sent from the local APIC unit, then system software would busy-wait for the delivery status bit to be cleared. In an APIC interface, according to one embodiment, the ICR 401 is combined into a single 64-bit MSR as shown in FIG. 4. A single MSR write to the ICR 401 is used for dispatching an interrupt. Specifically with the register interface to the APIC ICR 401 and 405, according to one embodiment, system software is not required to check the status of the delivery status bit prior to writing to the ICR to send an IPI.

In one embodiment, enabling the association (and more efficient implementation) of specific semantics with typical interrupt controller related operations, specifically TPR writes and EOI writes, may improve efficiency of interrupt-related communication and traffic while requiring the least amount of software rework. For example, the semantics for reading and writing to the TPR register via the ICRs illustrated in FIG. 4 may ensure that the result of any reprioritization action due to the change in processor priority is reflected to the processor prior to the next instruction following the TPR being executed. Any resulting deliverable interrupts would be taken at the instruction boundary following the TPR write. Accessing the EOI register via the ICRs of FIG. 4 ensures that the result of any reprioritization action due to the EOI is reflected to the processor prior to the next instruction following the EOI being executed. Any resulting deliverable interrupts would be taken at the instruction boundary following the EOI write.

In one embodiment, the use of MSRs to implement the ICR's illustrated in FIG. 4, can be mapped to the same address space as in legacy implementations. For example, in one embodiment, one-to-one correspondence is maintained between a legacy register offset and the MSR offset, except for registers where semantic change in behavior exists. In one embodiment, a legacy register may be 32-bit register on a 128-bit boundary. However, in one embodiment, in which a 32-bit register on 128-bit boundary corresponds to a 64-bit MSR, the MSR register offset may be calculated according to the formula:

"MSR register offset=Legacy register offset/16"

For an ICR according to one embodiment, however, two 32-bit legacy registers are combined into one 64-bit MSR, as illustrated in FIG. 4.

In one embodiment, the invention addresses issues associated with prior art MMIO-based interfaces with an APIC. Furthermore, at least one implementation of embodiments of the invention also provides for low incremental implementation cost in a system that needs to support both the legacy and the ICRs associated with at least one embodiment.

Figure 5A:
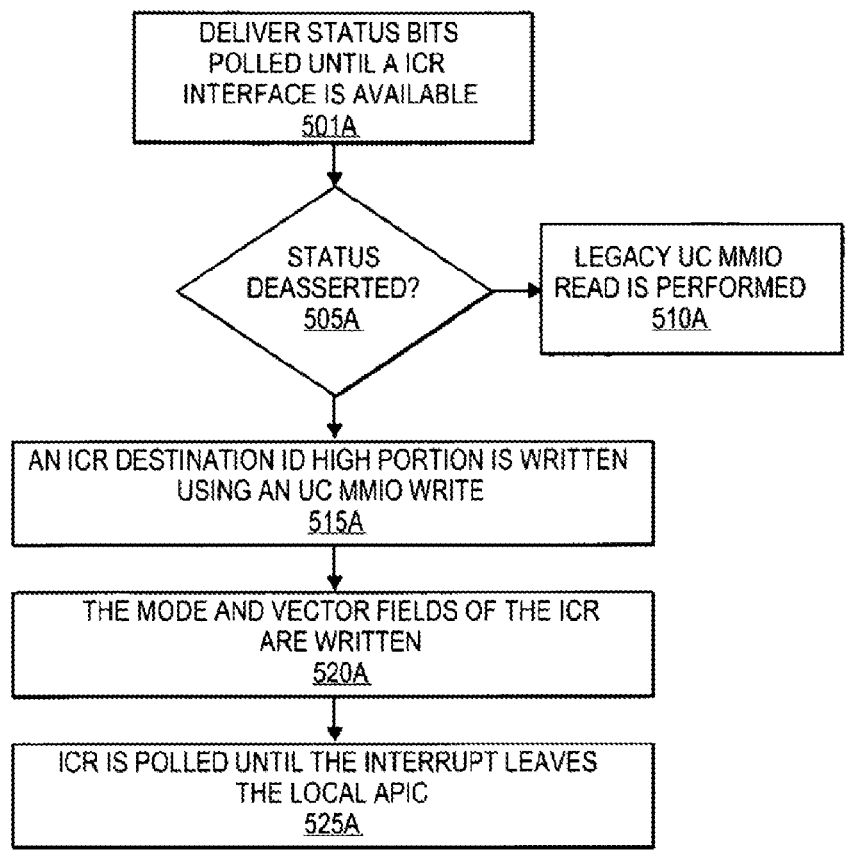
FIG. 5A is a flow diagram of operations that may be used for performing at least one embodiment of the invention.

FIG. 5a illustrates a flow diagram of operations that may be used in conjunction with at least one embodiment of the invention, regardless of the processor or system configuration in which the embodiment is used. Particularly, FIG. 5a illustrates a technique for communicating interrupts via legacy-supported protocol if the interrupt is communicated using legacy techniques, according to one embodiment. At operation 501*a*, delivery status bit (bit 12 in FIG. 4) is polled until a ICR interface is available. At operation 505*a*, while the status bit is deasserted, a legacy UC MMIO read is performed at 510*a*. In one embodiment, where legacy registers are 32 bits in length, an interrupt is sent by writing destination in high and low mode. For example, an interrupt target address is written to a general purpose register (e.g., "EAX" in an x86 processor). To be compliant with legacy mode, at operation 515*a*, an ICR destination ID high portion is written using an UC MMIO write. At operation 520*a*, the mode and vector fields of the ICR are written to indicate various legacy interrupt characteristics by performing a UC MMIO write to the low-order (e.g., lower 32 bits) of the ICR. At operation 525*a*, the ICR is polled until the interrupt leaves the local APIC by performing a loop of UC MMIO reads while the status field of the ICR is deasserted.

Figure 5B:
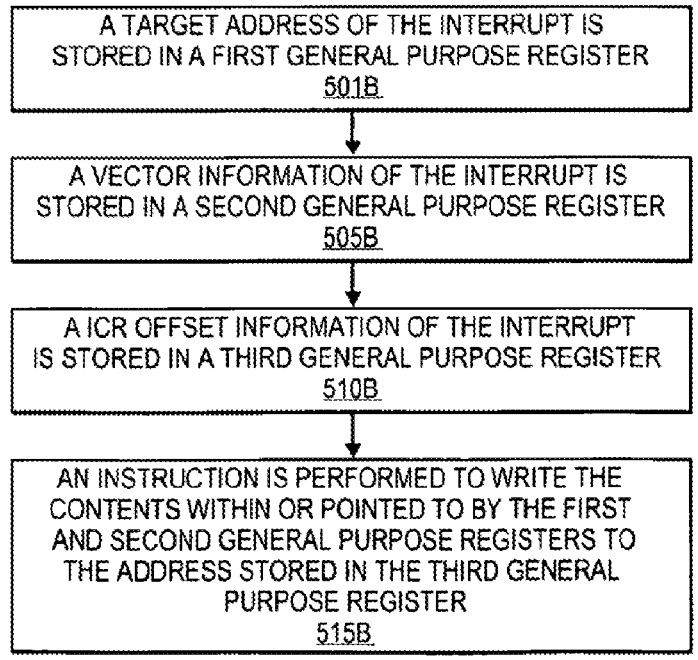
FIG. 5B is a flow diagram of operations that may be used for performing at least one alternative embodiment of the invention.

FIG. 5*b* illustrates a flow diagram of operations that may be used in conjunction with at least one embodiment of the invention, regardless of the processor or system configuration in which the embodiment is used. In one embodiment, an interrupt is communicated via an ICR interface which consists of a one or more MSR's as shown in FIG. 4, wherein the destination field is in upper 32-bits and the mode/vector information is in lower 32-bits. At operation 501*b*, a target address of the interrupt is stored in a first general purpose register (e.g., "EDX") and at operation 505*b*, g the mode and vector information is stored in a second general purpose register (e.g., "EAX"). At operation 510*b*, the ICR offset address, which corresponds to the ICR in the MSR address space, is stored in a third general purpose register (e.g., "ECX"). At operation 515*b*, g an instruction is performed to write the contents within or pointed to by the first and second general purpose registers to the address stored in the third general purpose register. In one embodiment, the instruction is a prior art MSR write instruction (e.g., "WRMSR"). In other embodiments the instruction may be a newly defined instruction particularly the ISA of the processor implementing the above techniques.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
   a first register to store an interrupt destination identifier (ID);
   a second register to store an interrupt vector;
   a third register to store an interrupt command register (ICR) offset;
   logic to communicate interrupt information from at least a first agent to at least a second agent, wherein the logic includes an interrupt control interface (ICI) to communicate interrupt information to be manipulated by an instruction without accessing memory-mapped input/output (MMIO) regions, and to co-exist with a legacy ICI;
   said first agent to store a destination ID portion to a first memory location via an uncached MMIO write operation in response to a determination of the ICR availability, and to perform the instruction to write the contents of said first and second registers to the ICR offset address of the third register; and
   said second agent to store the interrupt vector to a second memory location.

2. The apparatus of claim 1 wherein said second agent is to store both the interrupt vector and a delivery status bit deasserted to the second memory location via an uncached MMIO write operation.

3. The apparatus of claim 1 wherein said determination of the ICR availability is based on a delivery status bit that indicates ICR availability.

4. The apparatus of claim 1, wherein the ICI includes the ICR to store status information to indicate at least one pending interrupt.

5. The apparatus of claim 4, wherein the ICR includes a vector field.

6. The apparatus of claim 5, wherein the ICR includes a mode field.

7. The apparatus of claim 1, wherein said second register stores both interrupt vector and a delivery status bit.

8. The apparatus of claim 1, wherein the ICI is to communicate interrupt information to or from an advanced programmable interrupt controller (APIC).

9. The apparatus of claim 8, wherein the ICI is to support legacy and non-legacy communication with the APIC.

10. The apparatus of claim 9, wherein the APIC is one of a plurality of local APICs, each corresponding to a different agent.

11. A method comprising:
communicating an interrupt via an interrupt command register (ICR) comprising one or more model-specific registers (MSRs) without using memory-mapped input/output (MMIO) storage, wherein communicating the interrupt includes:
storing a target address of the interrupt in a first general purpose register;
storing an interrupt mode, and vector information in a second general purpose register;
storing an ICR offset address in a third general purpose register;
performing an instruction to write the target address and the mode and vector information to the ICR offset address;
and co-existing with a legacy interrupt control interface (ICI), wherein co-existing includes:
performing a first operation, in response to a determination of the ICR availability, to write a portion of the target address into a first memory location via an uncached MMIO write;
performing a second operation in response to said write to the ICR offset address to store the interrupt vector information into a second memory location.

12. The method of claim 11 wherein the second general purpose register is also to store a delivery status bit to indicate availability of the ICR.

13. The method of claim 12 wherein said first operation is to write a portion of the target address into the first memory location in response to a determination that the delivery status bit indicates availability of the ICR.

14. The method of claim 12 wherein said second operation is also to store the delivery status bit deasserted into the second memory location via an uncached MMIO write.

15. The method of claim 11, wherein the ICI is to communicate interrupt information to or from an advanced programmable interrupt controller (APIC).

16. The method of claim 11, wherein the ICI includes the ICR to store status information to indicate a pending interrupt.

17. A system comprising:
a memory including a memory-mapped input/output (MMIO) address space;
a plurality of processors having a plurality of advanced programmable interrupt controllers (APICs), wherein each of the plurality of APICs is able to communicate interrupt information via an interrupt command register (ICR) interface without writing or reading the interrupt information to or from the MMIO address space within the memory, and wherein the plurality of processors is able to co-exist with a legacy ICR interface;
a first processor of the plurality of processors to store an ICR destination identifier portion to a first memory location via an uncached MMIO write in response to a determination of the ICR availability; and
a second processor of the plurality of processors to store an interrupt vector information to a second memory location.

18. The system of claim 17, wherein both the first and second memory locations are at uncached MMIO memory addresses.

19. The system of claim 17, wherein said first processor is to store the ICR destination identifier portion to the first memory location in response to a determination that a delivery status bit indicates availability of the ICR.

20. The system of claim 19, wherein said second processor is also to store the delivery status bit deasserted into the second memory location via an uncached MMIO write.

* * * * *